United States Patent
Johnson et al.

(10) Patent No.: US 8,268,176 B2
(45) Date of Patent: *Sep. 18, 2012

(54) BACKWASH

(75) Inventors: Warren Thomas Johnson, New South Wales (AU); Thomas William Beck, New South Wales (AU); Fufang Zha, New South Wales (AU); Huw Alexander Lazaredes, New South Wales (AU); Zhiyi Cao, New South Wales (AU)

(73) Assignee: Siemens Industry, Inc., Alpharetta, GA (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/569,565

(22) PCT Filed: Aug. 27, 2004

(86) PCT No.: PCT/AU2004/001157
§ 371 (c)(1),
(2), (4) Date: Feb. 27, 2006

(87) PCT Pub. No.: WO2005/021140
PCT Pub. Date: Mar. 10, 2005

(65) Prior Publication Data
US 2007/0007205 A1     Jan. 11, 2007

(30) Foreign Application Priority Data

Aug. 29, 2003   (AU) ................................ 2003904748
Sep. 19, 2003   (AU) ................................ 2003905139

(51) Int. Cl.
*B01D 65/02* (2006.01)
(52) U.S. Cl. ......... 210/636; 210/650; 210/741; 210/637
(58) Field of Classification Search .................. 210/636, 210/650, 741, 637
See application file for complete search history.

(56) References Cited

U.S. PATENT DOCUMENTS
256,008 A    4/1882   Leak
(Continued)

FOREIGN PATENT DOCUMENTS
AU    34400/84 A    4/1985
(Continued)

OTHER PUBLICATIONS
Y. Nakayama, "Introduction to Fluid Mechanics," pub. Butterworth-Heinemann, Oxford, UK, 2000.*
(Continued)

*Primary Examiner* — Walter D Griffin
*Assistant Examiner* — Denise R Anderson

(57) ABSTRACT

A method of backwashing a membrane filtration module (4), said module (4) including one or more membranes (5) located in a feed-containing vessel (3), the membranes (5) having a permeable wall which is subjected to a filtration operation wherein feed containing contaminant matter is applied to one side of the membrane wall and filtrate is withdrawn from the other side of the membrane wall, the method including: removing liquid from the feed-containing vessel (3) until the level of liquid in the feed-containing vessel (3) falls to a first level (L2) below an upper level of the membranes; suspending the filtration operation; performing a liquid backwash of the membrane wall until liquid level within the feed-containing vessel (3) rises to a second predetermined level (L1) above said first level; aerating the membrane surface with gas bubbles to dislodge fouling materials therefrom; performing a sweep or drain down of the feed-containing vessel (3) to remove the liquid containing the dislodged contaminant matter; and recommencing the filtration operation.

24 Claims, 3 Drawing Sheets

U.S. PATENT DOCUMENTS

| | | |
|---|---|---|
| 285,321 A | 9/1883 | Tams |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |

| | | |
|---|---|---|
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A * | 5/1993 | Sunaoka et al. ............... 210/636 |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A * | 3/1997 | Cote et al. ............... 210/650 |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A * | 9/1999 | Lawrence et al. ............. 210/636 |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A * | 4/2000 | Cote et al. ............... 210/636 |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |

| Patent No. | Kind | Date | Inventor |
|---|---|---|---|
| 6,083,393 | A | 7/2000 | Wu et al. |
| 6,096,213 | A | 8/2000 | Radovanovic et al. |
| 6,113,782 | A | 9/2000 | Leonard |
| 6,120,688 | A | 9/2000 | Daly et al. |
| 6,126,819 | A | 10/2000 | Heine et al. |
| 6,146,747 | A | 11/2000 | Wang et al. |
| 6,149,817 | A | 11/2000 | Peterson et al. |
| 6,156,200 | A | 12/2000 | Zha et al. |
| 6,159,373 | A | 12/2000 | Beck et al. |
| 6,193,890 | B1 | 2/2001 | Pedersen et al. |
| 6,202,475 | B1 | 3/2001 | Selbie et al. |
| 6,214,231 | B1 | 4/2001 | Cote et al. |
| 6,214,232 | B1 | 4/2001 | Baurmeister et al. |
| 6,221,247 | B1 | 4/2001 | Nemser et al. |
| 6,245,239 | B1 | 6/2001 | Cote et al. |
| 6,254,773 | B1 | 7/2001 | Biltoft |
| 6,264,839 | B1 | 7/2001 | Mohr et al. |
| 6,277,512 | B1 | 8/2001 | Hamrock et al. |
| 6,280,626 | B1 | 8/2001 | Miyashita et al. |
| 6,284,135 | B1 | 9/2001 | Ookata |
| 6,290,756 | B1 | 9/2001 | Macheras et al. |
| 6,294,039 | B1 | 9/2001 | Mahendran et al. |
| 6,299,773 | B1 | 10/2001 | Takamura et al. |
| 6,303,026 | B1 | 10/2001 | Lindbo |
| 6,303,035 | B1 * | 10/2001 | Cote et al. ............ 210/636 |
| 6,315,895 | B1 | 11/2001 | Summerton et al. |
| 6,319,411 | B1 | 11/2001 | Cote |
| 6,322,703 | B1 | 11/2001 | Taniguchi et al. |
| 6,324,898 | B1 | 12/2001 | Cote et al. |
| 6,325,928 | B1 | 12/2001 | Pedersen et al. |
| 6,325,938 | B1 | 12/2001 | Miyashita et al. |
| 6,331,248 | B1 | 12/2001 | Taniguchi et al. |
| 6,337,018 | B1 | 1/2002 | Mickols |
| RE37,549 | E | 2/2002 | Mahendran et al. |
| 6,349,835 | B1 | 2/2002 | Saux et al. |
| 6,354,444 | B1 | 3/2002 | Mahendran et al. |
| 6,361,695 | B1 | 3/2002 | Husain et al. |
| 6,368,819 | B1 | 4/2002 | Gaddy et al. |
| 6,372,138 | B1 | 4/2002 | Cho et al. |
| 6,375,848 | B1 | 4/2002 | Cote et al. |
| 6,383,369 | B2 | 5/2002 | Elston |
| 6,387,189 | B1 | 5/2002 | Groschl et al. |
| 6,402,955 | B2 | 6/2002 | Ookata |
| 6,406,629 | B1 | 6/2002 | Husain et al. |
| 6,423,214 | B1 | 7/2002 | Lindbo |
| 6,423,784 | B1 | 7/2002 | Hamrock et al. |
| 6,432,310 | B1 | 8/2002 | Andou et al. |
| 6,440,303 | B2 | 8/2002 | Spriegel |
| D462,699 | S | 9/2002 | Johnson et al. |
| 6,444,124 | B1 | 9/2002 | Onyeche et al. |
| 6,468,430 | B1 | 10/2002 | Kimura et al. |
| 6,471,869 | B1 | 10/2002 | Yanou et al. |
| 6,485,645 | B1 | 11/2002 | Husain et al. |
| 6,495,041 | B2 | 12/2002 | Taniguchi et al. |
| 6,517,723 | B1 | 2/2003 | Daigger et al. |
| 6,524,481 | B2 | 2/2003 | Zha et al. |
| 6,524,733 | B1 | 2/2003 | Nonobe |
| 6,550,747 | B2 | 4/2003 | Rabie et al. |
| 6,555,005 | B1 * | 4/2003 | Zha et al. ............ 210/636 |
| 6,562,237 | B1 | 5/2003 | Olaopa |
| 6,576,136 | B1 | 6/2003 | De Moel et al. |
| 6,592,762 | B2 | 7/2003 | Smith |
| D478,913 | S | 8/2003 | Johnson et al. |
| 6,613,222 | B2 | 9/2003 | Mikkelson et al. |
| 6,620,319 | B2 | 9/2003 | Behmann et al. |
| 6,623,643 | B2 | 9/2003 | Chisholm et al. |
| 6,632,358 | B1 | 10/2003 | Suga et al. |
| 6,635,179 | B1 | 10/2003 | Summerton et al. |
| 6,641,733 | B2 | 11/2003 | Zha et al. |
| 6,645,374 | B2 | 11/2003 | Cote et al. |
| 6,656,356 | B2 | 12/2003 | Gungerich et al. |
| 6,682,652 | B2 | 1/2004 | Mahendran et al. |
| 6,685,832 | B2 | 2/2004 | Mahendran et al. |
| 6,696,465 | B2 | 2/2004 | Dellaria et al. |
| 6,702,561 | B2 | 3/2004 | Stillig et al. |
| 6,706,185 | B2 | 3/2004 | Goel et al. |
| 6,706,189 | B2 | 3/2004 | Rabie et al. |
| 6,708,957 | B2 | 3/2004 | Cote et al. |
| 6,712,970 | B1 | 3/2004 | Trivedi |
| 6,721,529 | B2 | 4/2004 | Chen et al. |
| 6,723,242 | B1 | 4/2004 | Ohkata et al. |
| 6,723,758 | B2 | 4/2004 | Stone et al. |
| 6,727,305 | B1 | 4/2004 | Pavez Aranguiz |
| 6,743,362 | B1 | 6/2004 | Porteous et al. |
| 6,755,970 | B1 | 6/2004 | Knappe et al. |
| 6,758,972 | B2 | 7/2004 | Vriens et al. |
| 6,761,826 | B2 | 7/2004 | Bender |
| 6,770,202 | B1 | 8/2004 | Kidd et al. |
| 6,780,466 | B2 | 8/2004 | Grangeon et al. |
| 6,783,008 | B2 | 8/2004 | Zha et al. |
| 6,790,347 | B2 | 9/2004 | Jeong et al. |
| 6,790,912 | B2 | 9/2004 | Blong |
| 6,805,806 | B2 | 10/2004 | Arnaud |
| 6,808,629 | B2 | 10/2004 | Wouters-Wasiak et al. |
| 6,811,696 | B2 | 11/2004 | Wang et al. |
| 6,814,861 | B2 | 11/2004 | Husain et al. |
| 6,821,420 | B2 | 11/2004 | Zha et al. |
| 6,830,782 | B2 | 12/2004 | Kanazawa |
| 6,841,070 | B2 | 1/2005 | Zha et al. |
| 6,861,466 | B2 | 3/2005 | Dadalas et al. |
| 6,863,816 | B2 | 3/2005 | Austin et al. |
| 6,863,817 | B2 | 3/2005 | Liu et al. |
| 6,863,818 | B2 | 3/2005 | Daigger et al. |
| 6,863,823 | B2 | 3/2005 | Cote |
| 6,869,534 | B2 | 3/2005 | McDowell et al. |
| 6,872,305 | B2 | 3/2005 | Johnson et al. |
| 6,881,343 | B2 | 4/2005 | Rabie et al. |
| 6,884,350 | B2 | 4/2005 | Muller |
| 6,884,375 | B2 | 4/2005 | Wang et al. |
| 6,890,435 | B2 | 5/2005 | Ji et al. |
| 6,890,645 | B2 | 5/2005 | Disse et al. |
| 6,893,568 | B1 | 5/2005 | Janson et al. |
| 6,936,085 | B2 | 8/2005 | DeMarco |
| 6,946,073 | B2 | 9/2005 | Daigger et al. |
| 6,952,258 | B2 | 10/2005 | Ebert et al. |
| 6,955,762 | B2 | 10/2005 | Gallagher et al. |
| 6,962,258 | B2 | 11/2005 | Zha et al. |
| 6,964,741 | B2 | 11/2005 | Mahendran et al. |
| 6,969,465 | B2 | 11/2005 | Zha et al. |
| 6,974,554 | B2 | 12/2005 | Cox et al. |
| 6,994,867 | B1 | 2/2006 | Hossainy et al. |
| 7,005,100 | B2 | 2/2006 | Lowell |
| 7,014,763 | B2 | 3/2006 | Johnson et al. |
| 7,018,530 | B2 | 3/2006 | Pollock |
| 7,018,533 | B2 | 3/2006 | Johnson et al. |
| 7,022,233 | B2 | 4/2006 | Chen |
| 7,041,728 | B2 | 5/2006 | Zipplies et al. |
| 7,052,610 | B2 | 5/2006 | Janson et al. |
| 7,083,733 | B2 | 8/2006 | Freydina et al. |
| 7,087,173 | B2 | 8/2006 | Cote et al. |
| 7,122,121 | B1 | 10/2006 | Ji |
| 7,147,777 | B1 | 12/2006 | Porteous |
| 7,147,778 | B1 | 12/2006 | DiMassimo et al. |
| 7,160,455 | B2 | 1/2007 | Taniguchi et al. |
| 7,160,463 | B2 | 1/2007 | Beck et al. |
| 7,160,464 | B2 | 1/2007 | Lee et al. |
| 7,172,699 | B1 | 2/2007 | Trivedi et al. |
| 7,172,701 | B2 | 2/2007 | Gaid et al. |
| 7,186,344 | B2 | 3/2007 | Hughes |
| 7,208,091 | B2 | 4/2007 | Pind et al. |
| 7,223,340 | B2 | 5/2007 | Zha et al. |
| 7,226,541 | B2 | 6/2007 | Muller et al. |
| 7,247,238 | B2 | 7/2007 | Mullette et al. |
| 7,264,716 | B2 | 9/2007 | Johnson et al. |
| 7,279,100 | B2 | 10/2007 | Devine |
| 7,279,215 | B2 | 10/2007 | Hester et al. |
| 7,300,022 | B2 | 11/2007 | Muller |
| 7,314,563 | B2 | 1/2008 | Cho et al. |
| 7,329,344 | B2 | 2/2008 | Jordan et al. |
| 7,344,645 | B2 | 3/2008 | Beck et al. |
| 7,361,274 | B2 | 4/2008 | Lazaredes |
| 7,378,024 | B2 | 5/2008 | Bartels et al. |
| 7,387,723 | B2 | 6/2008 | Jordan |
| 7,404,896 | B2 | 7/2008 | Muller |
| 7,455,765 | B2 | 11/2008 | Elefritz et al. |
| 7,481,933 | B2 | 1/2009 | Barnes |
| 7,510,655 | B2 | 3/2009 | Barnes |
| 7,531,042 | B2 | 5/2009 | Murkute et al. |

| | | |
|---|---|---|
| 7,563,363 B2 | 7/2009 | Kuzma |
| 7,591,950 B2 | 9/2009 | Zha et al. |
| 7,632,439 B2 | 12/2009 | Mullette et al. |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0117444 A1 | 8/2002 | Mikkelson et al. |
| 2002/0130080 A1* | 9/2002 | Cote et al. ............ 210/650 |
| 2002/0148767 A1 | 10/2002 | Johnson et al. |
| 2002/0153313 A1 | 10/2002 | Cote |
| 2002/0175121 A1* | 11/2002 | Vecchio et al. ........ 210/636 |
| 2002/0185435 A1 | 12/2002 | Husain et al. |
| 2002/0189999 A1 | 12/2002 | Espenan et al. |
| 2002/0195390 A1* | 12/2002 | Zha et al. ............ 210/636 |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1* | 7/2003 | Ando et al. ............ 210/636 |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 55847/86 A | 9/1986 |
| AU | 77066/87 A | 2/1988 |
| AU | 762091 B2 | 6/2003 |
| CA | 2531764 A1 | 3/2005 |
| CN | 86104888 | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1249698 A | 4/2000 |
| CN | 1541757 A | 11/2004 |
| DE | 3904544 A1 | 8/1990 |
| DE | 4117281 A1 | 1/1992 |
| DE | 4113420 A1 | 10/1992 |

| | | | | | | |
|---|---|---|---|---|---|---|
| DE | 4117422 | C1 | 11/1992 | JP | 61291007 A | 12/1986 |
| DE | 4326603 | A1 | 2/1995 | JP | 61293504 A | 12/1986 |
| DE | 19503060 | A1 | 8/1996 | JP | 62004408 A | 1/1987 |
| DE | 29804927 | U1 | 6/1998 | JP | 62068828 A | 3/1987 |
| DE | 29906389 | U1 | 6/1999 | JP | 62114609 A | 5/1987 |
| DE | 10209170 | C1 | 8/2003 | JP | 62140607 A | 6/1987 |
| EP | 012557 | B1 | 2/1983 | JP | 62144708 A | 6/1987 |
| EP | 126714 | A2 | 11/1984 | JP | 62163708 A | 7/1987 |
| EP | 050447 | B1 | 10/1985 | JP | 62179540 A | 8/1987 |
| EP | 194735 | A2 | 9/1986 | JP | 62237908 A | 10/1987 |
| EP | 250337 | A1 | 12/1987 | JP | 62250908 A | 10/1987 |
| EP | 327025 | A1 | 8/1989 | JP | 62187606 | 11/1987 |
| EP | 344633 | A1 | 12/1989 | JP | 62262710 A * | 11/1987 |
| EP | 090383 | B1 | 5/1990 | JP | 63097634 A | 4/1988 |
| EP | 407900 | A2 | 1/1991 | JP | 63099246 A | 4/1988 |
| EP | 463627 | A2 | 1/1992 | JP | 63143905 A | 6/1988 |
| EP | 0464321 | A1 | 1/1992 | JP | 63171607 A | 7/1988 |
| EP | 492942 | A2 | 7/1992 | JP | 63180254 A | 7/1988 |
| EP | 518250 | B1 | 12/1992 | JP | S63-38884 | 10/1988 |
| EP | 547575 | A1 | 6/1993 | JP | 64-075542 A | 3/1989 |
| EP | 280052 | B1 | 7/1994 | JP | 1-501046 T | 4/1989 |
| EP | 395133 | B1 | 2/1995 | JP | 1111494 | 4/1989 |
| EP | 662341 | A1 | 7/1995 | JP | 01151906 A | 6/1989 |
| EP | 492446 | B1 | 11/1995 | JP | 01-307409 A | 12/1989 |
| EP | 430082 | B1 | 6/1996 | JP | 02-017925 | 1/1990 |
| EP | 734758 | A1 | 10/1996 | JP | 02017924 | 1/1990 |
| EP | 763758 | A1 | 3/1997 | JP | 02026625 | 1/1990 |
| EP | 824956 | A2 | 2/1998 | JP | 02031200 A | 2/1990 |
| EP | 848194 | A2 | 6/1998 | JP | 02040296 A | 2/1990 |
| EP | 855214 | A1 | 7/1998 | JP | 02107318 A | 4/1990 |
| EP | 627255 | B1 | 1/1999 | JP | 02126922 A | 5/1990 |
| EP | 911073 | A1 | 4/1999 | JP | 02144132 A | 6/1990 |
| EP | 920904 | A2 | 6/1999 | JP | 02164423 A | 6/1990 |
| EP | 0937494 | A2 | 8/1999 | JP | 02174918 A | 7/1990 |
| EP | 1034835 | A1 | 9/2000 | JP | 02241523 A | 9/1990 |
| EP | 1052012 | A1 | 11/2000 | JP | 02277528 A | 11/1990 |
| EP | 1156015 | A1 | 11/2001 | JP | 02284035 A | 11/1990 |
| EP | 1300186 | A1 | 4/2003 | JP | 03018373 A | 1/1991 |
| EP | 1349644 | B1 | 10/2003 | JP | 03028797 A | 2/1991 |
| EP | 1350555 | A1 | 10/2003 | JP | 03-086529 A | 4/1991 |
| EP | 1236503 | B1 | 8/2004 | JP | 03110445 A | 5/1991 |
| EP | 1445240 | | 8/2004 | JP | 04108518 A | 4/1992 |
| EP | 1466658 | A1 | 10/2004 | JP | 04110023 A | 4/1992 |
| EP | 1659171 | A1 | 5/2006 | JP | 4-190889 | 7/1992 |
| EP | 1420874 | B1 | 1/2011 | JP | 04187224 A | 7/1992 |
| FR | 2620712 | A1 | 3/1989 | JP | 4-256425 A | 9/1992 |
| FR | 2674448 | A1 | 10/1992 | JP | 04250898 A | 9/1992 |
| FR | 2699424 | A1 | 6/1994 | JP | 04256424 A | 9/1992 |
| FR | 2762834 | A1 | 11/1998 | JP | 04265128 A | 9/1992 |
| GB | 702911 | A | 1/1954 | JP | 04293527 A | 10/1992 |
| GB | 996195 | A | 6/1965 | JP | 04310223 A | 11/1992 |
| GB | 2253572 | A | 9/1992 | JP | 04317793 A | 11/1992 |
| JP | 52-078677 | A | 7/1977 | JP | 04334530 A | 11/1992 |
| JP | 53-5077 | | 1/1978 | JP | 04348252 A | 12/1992 |
| JP | 53108882 | A | 9/1978 | JP | 05023557 A | 2/1993 |
| JP | 54162684 | A | 12/1979 | JP | 05096136 A | 4/1993 |
| JP | 55099703 | A | 7/1980 | JP | 05137977 A | 6/1993 |
| JP | 55129107 | A | 10/1980 | JP | 05157654 A | 6/1993 |
| JP | 55129155 | A | 10/1980 | JP | 05161831 A | 6/1993 |
| JP | 56021604 | A | 2/1981 | JP | 05279447 A | 10/1993 |
| JP | 56118701 | A | 9/1981 | JP | 05285348 A | 11/1993 |
| JP | 56121685 | A | 9/1981 | JP | 05305221 A | 11/1993 |
| JP | 57190697 | A | 11/1982 | JP | 06-027215 | 2/1994 |
| JP | 58088007 | A | 5/1983 | JP | 06071120 A | 3/1994 |
| JP | 60019002 | A | 1/1985 | JP | 06114240 A | 4/1994 |
| JP | 60-206412 | A | 10/1985 | JP | 06170364 A | 6/1994 |
| JP | 60260628 | A | 12/1985 | JP | 06190250 | 7/1994 |
| JP | 61097005 | A | 5/1986 | JP | 06218237 A | 8/1994 |
| JP | 61097006 | A | 5/1986 | JP | 06238273 | 8/1994 |
| JP | 61107905 | A | 5/1986 | JP | 06-292820 A | 10/1994 |
| JP | 61167406 | A | 7/1986 | JP | 06277469 A | 10/1994 |
| JP | 61167407 | A | 7/1986 | JP | 06285496 A | 10/1994 |
| JP | 61171504 | A | 8/1986 | JP | 06343837 A | 12/1994 |
| JP | 61192309 | A | 8/1986 | JP | 07000770 A | 1/1995 |
| JP | 61222510 | A | 10/1986 | JP | 07024272 A | 1/1995 |
| JP | 61242607 | A | 10/1986 | JP | 07047247 A | 2/1995 |
| JP | 61249505 | A | 11/1986 | JP | 07068139 A | 3/1995 |
| JP | 61257203 | A | 11/1986 | JP | 07136470 A | 5/1995 |
| JP | 61263605 | A | 11/1986 | JP | 07136471 A | 5/1995 |

| | | | | | | | |
|---|---|---|---|---|---|---|---|
| JP | 07155564 | A | 6/1995 | JP | 2000317276 | A | 11/2000 |
| JP | 07155758 | A | 6/1995 | JP | 2000-334276 | A | 12/2000 |
| JP | 7-39921 | | 7/1995 | JP | 2000342932 | A | 12/2000 |
| JP | 07178323 | A | 7/1995 | JP | 2001009246 | A | 1/2001 |
| JP | 07185268 | A | 7/1995 | JP | 2001070967 | A | 3/2001 |
| JP | 07185270 | A | 7/1995 | JP | 2001079366 | A | 3/2001 |
| JP | 07185271 | A | 7/1995 | JP | 2001079367 | A | 3/2001 |
| JP | 07185272 | A | 7/1995 | JP | 2001104760 | A | 4/2001 |
| JP | 07236819 | A | 9/1995 | JP | 2001120963 | A | 5/2001 |
| JP | 07-256253 | | 10/1995 | JP | 2001179059 | A | 7/2001 |
| JP | 07251043 | A | 10/1995 | JP | 2001179060 | A | 7/2001 |
| JP | 07275665 | A | 10/1995 | JP | 2001190937 | A | 7/2001 |
| JP | 07289860 | A | 11/1995 | JP | 2001190938 | A | 7/2001 |
| JP | 07303895 | A | 11/1995 | JP | 2001205055 | A | 7/2001 |
| JP | 07313973 | A | 12/1995 | JP | 2001510396 | T | 7/2001 |
| JP | 08010585 | A | 1/1996 | JP | 2001-269546 | | 10/2001 |
| JP | 8039089 | A | 2/1996 | JP | 2002177746 | A | 6/2002 |
| JP | 08-197053 | A | 8/1996 | JP | 3302992 | B2 | 7/2002 |
| JP | 08323161 | A | 12/1996 | JP | 2002-527229 | A | 8/2002 |
| JP | 08332357 | A | 12/1996 | JP | 2002525197 | T | 8/2002 |
| JP | 09000890 | A | 1/1997 | JP | 2002263407 | A | 9/2002 |
| JP | 09038470 | A | 2/1997 | JP | 2002-336663 | | 11/2002 |
| JP | 09-075689 | A | 3/1997 | JP | 2003024751 | | 1/2003 |
| JP | 09072993 | A | 3/1997 | JP | 2003047830 | A | 2/2003 |
| JP | 09099227 | A | 4/1997 | JP | 2003053157 | A | 2/2003 |
| JP | 9103661 | A | 4/1997 | JP | 2003053160 | A | 2/2003 |
| JP | 9138298 | A | 5/1997 | JP | 200371254 | A | 3/2003 |
| JP | 09141063 | A | 6/1997 | JP | 2003062436 | A | 3/2003 |
| JP | 09155345 | A | 6/1997 | JP | 2003135935 | A | 5/2003 |
| JP | 09187628 | A | 7/1997 | JP | 2003190976 | A | 7/2003 |
| JP | 09192458 | A | 7/1997 | JP | 2003-265597 | | 9/2003 |
| JP | 09220569 | A | 8/1997 | JP | 2003-275548 | A | 9/2003 |
| JP | 09271641 | A | 10/1997 | JP | 2003266072 | A | 9/2003 |
| JP | 09-313902 | A | 12/1997 | JP | 2003275759 | A | 9/2003 |
| JP | 09324067 | A | 12/1997 | JP | 2003340250 | A | 12/2003 |
| JP | 10-015365 | A | 1/1998 | JP | 2004-008981 | | 1/2004 |
| JP | 10024222 | A | 1/1998 | JP | 2004-230287 | A | 8/2004 |
| JP | 10033955 | A | 2/1998 | JP | 2004230280 | A | 8/2004 |
| JP | 10048466 | A | 2/1998 | JP | 2004322100 | A | 11/2004 |
| JP | 10076144 | A | 3/1998 | JP | 2004337730 | A | 12/2004 |
| JP | 10076264 | A | 3/1998 | JP | 2005-087887 | A | 4/2005 |
| JP | 10085562 | A | 4/1998 | JP | 2005144291 | A | 6/2005 |
| JP | 10085565 | A | 4/1998 | JP | 2005154551 | A | 6/2005 |
| JP | 10085566 | A | 4/1998 | JP | 2005279447 | A | 10/2005 |
| JP | 10156149 | A | 6/1998 | JP | 2006-116495 | | 5/2006 |
| JP | 10180048 | A | 7/1998 | JP | 2007-547083 | | 8/2010 |
| JP | 10225685 | A | 8/1998 | JP | 4833353 | B2 | 12/2011 |
| JP | 10235168 | A | 9/1998 | KR | 20-0232145 | | 7/2001 |
| JP | 10286441 | A | 10/1998 | KR | 1020020067227 | | 8/2002 |
| JP | 10328538 | A | 12/1998 | KR | 20-0295350 | | 11/2002 |
| JP | 11005023 | A | 1/1999 | KR | 2002-0090967 | | 12/2002 |
| JP | 11028467 | A | 2/1999 | KR | 2003-033812 | | 5/2003 |
| JP | 11031025 | A | 2/1999 | KR | 2003-060625 | | 7/2003 |
| JP | 11033365 | A | 2/1999 | KR | 2005-063478 | | 6/2005 |
| JP | 11033367 | A | 2/1999 | NL | 1020491 | C | 10/2003 |
| JP | 11076769 | A | 3/1999 | NL | 1021197 | C | 10/2003 |
| JP | 11156166 | A | 6/1999 | NZ | 510394 | A | 5/2003 |
| JP | 11156360 | A | 6/1999 | NZ | 537874 | A | 2/2007 |
| JP | 11165200 | A | 6/1999 | TW | 347343 | | 12/1998 |
| JP | 11-179171 | A | 7/1999 | WO | 8501449 | A1 | 4/1985 |
| JP | 11-309351 | A | 11/1999 | WO | 8605116 | A1 | 9/1986 |
| JP | 11302438 | A | 11/1999 | WO | 8605705 | A1 | 10/1986 |
| JP | 11319501 | A | 11/1999 | WO | 8800494 | A1 | 1/1988 |
| JP | 11319507 | A | 11/1999 | WO | 8801529 | A1 | 3/1988 |
| JP | 11333265 | A | 12/1999 | WO | 8801895 | A1 | 3/1988 |
| JP | 2000000439 | A | 1/2000 | WO | 8806200 | A1 | 8/1988 |
| JP | 2000051669 | A | 2/2000 | WO | 8900880 | A1 | 2/1989 |
| JP | 2000061466 | A | 2/2000 | WO | 9000434 | A1 | 1/1990 |
| JP | 200079390 | A | 3/2000 | WO | 9104783 | A1 | 4/1991 |
| JP | 2000070684 | A | 3/2000 | WO | 9116124 | A1 | 10/1991 |
| JP | 2000-093758 | | 4/2000 | WO | 9302779 | A1 | 2/1993 |
| JP | 2000-157845 | | 6/2000 | WO | 9315827 | A1 | 8/1993 |
| JP | 2000157850 | A | 6/2000 | WO | 9323152 | A1 | 11/1993 |
| JP | 2000185220 | A | 7/2000 | WO | 9411094 | A1 | 5/1994 |
| JP | 2000189958 | A | 7/2000 | WO | 9534424 | A1 | 12/1995 |
| JP | 2000233020 | A | 8/2000 | WO | 9603202 | A1 | 2/1996 |
| JP | 2000237548 | A | 9/2000 | WO | 9607470 | A1 | 3/1996 |
| JP | 2000237548 | A * | 9/2000 | WO | 9628236 | A1 | 9/1996 |
| JP | 2000300968 | A | 10/2000 | WO | 9629142 | A1 | 9/1996 |

| | | | |
|---|---|---|---|
| WO | 9641676 A1 | 12/1996 | |
| WO | 9706880 A2 | 2/1997 | |
| WO | 9822204 A1 | 5/1998 | |
| WO | 9825694 A1 | 6/1998 | |
| WO | WO 9828066 A1 | 7/1998 | |
| WO | 9853902 A1 | 12/1998 | |
| WO | 9901207 A1 | 1/1999 | |
| WO | 99-55448 A1 | 11/1999 | |
| WO | 9959707 A1 | 11/1999 | |
| WO | 0018498 A1 | 4/2000 | |
| WO | 0030742 A1 | 6/2000 | |
| WO | 0100307 A2 | 1/2001 | |
| WO | 0105715 A1 | 1/2001 | |
| WO | 0108790 A1 | 2/2001 | |
| WO | 0119414 A1 | 3/2001 | |
| WO | 0132299 A1 | 5/2001 | |
| WO | 0136075 A1 | 5/2001 | |
| WO | 0143856 A1 | 6/2001 | |
| WO | 0145829 A1 | 6/2001 | |
| WO | 0226363 A2 | 4/2002 | |
| WO | 0230550 A1 | 4/2002 | |
| WO | 0240140 A1 | 5/2002 | |
| WO | 0247800 A1 | 6/2002 | |
| WO | 03000389 A2 | 1/2003 | |
| WO | WO03013706 A1 | * 2/2003 | |
| WO | 03024575 A1 | 3/2003 | |
| WO | 03053552 A1 | 7/2003 | |
| WO | 03057632 A1 | 7/2003 | |
| WO | 03059495 A1 | 7/2003 | |
| WO | 03068374 A1 | 8/2003 | |
| WO | 03095078 A1 | 11/2003 | |
| WO | 2004018084 A1 | 3/2004 | |
| WO | 2004024304 A2 | 3/2004 | |
| WO | 2004033078 A1 | 4/2004 | |
| WO | 2004050221 A1 | 6/2004 | |
| WO | 2004056458 A3 | 7/2004 | |
| WO | 2004078327 A1 | 9/2004 | |
| WO | 2004101120 A1 | 11/2004 | |
| WO | 2005005028 A1 | 1/2005 | |
| WO | 2005021140 A1 | 3/2005 | |
| WO | 2005028085 A1 | 3/2005 | |
| WO | 2005028086 A1 | 3/2005 | |
| WO | 2005037414 A1 | 4/2005 | |
| WO | 2005046849 A1 | 5/2005 | |
| WO | 2005077499 A1 | 8/2005 | |
| WO | 2005082498 A1 | 9/2005 | |
| WO | 2005107929 A2 | 11/2005 | |
| WO | 2006026814 A1 | 3/2006 | |
| WO | 2006029456 A1 | 3/2006 | |
| WO | 2006029465 | 3/2006 | |
| WO | 2006047814 A1 | 5/2006 | |
| WO | 2006066350 A1 | 6/2006 | |
| WO | 2007053528 A2 | 5/2007 | |
| WO | 2007065956 A1 | 6/2007 | |
| WO | 2007135087 A1 | 11/2007 | |
| WO | 2008034570 A1 | 3/2008 | |
| WO | 2008153818 A1 | 12/2008 | |
| WO | 2009030405 A1 | 3/2009 | |

OTHER PUBLICATIONS

Supplementary EP Search Report; Application No. EP 04 76 1194; dated Sep. 21, 2006.
Examination Report for corresponding Patent Application No. 1197/DELNP/2006, dated Jan. 13, 2009.
"Chemical Cleaning Definition", Lenntech BV, Lenntech Water Treatment & Purification Holding B.V., Chemical Cleaning.
Almulla et al., "Developments in high recovery brackish water desalination plants as part of the solution to water quantity problems," Desalination, 153 (2002), pp. 237-243.
Anonymous, "Nonwoven Constructions of Dyneon™ THV and Dyneon™ HTE Fluorothermoplastics", Research Disclosure Journal, Apr. 1999, RD 420013, 2 pages.
Chinese Office Action dated Oct. 12, 2010 for Application No. 200480024762.X.
Chinese Third Office Action dated Apr. 13, 2010 for Application No. 200480024762.X.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., "Neural networks for long term prediction of fouling and backwash efficiency in ultrafiltration for drinking water production," Desalination, 131 (2000), pp. 353-362.
Dow Chemical Company, "Filmtec Membranes—Cleaning Procedures for Filmtec FT30 Elements," Tech Facts, Online, Jun. 30, 2000, XP002237568.
European Examination Report dated Nov. 19, 2010 for Application No. 04 761 194.2.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Japanese Office Action dated May 25, 2010 for Application No. 2006-524173.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999, Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk-Othmer Encyclopedia of Chemical Technology, Peroxides and Peroxy Compounds, Inorganic, To Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
U.S. Appl. No. 60/278,007 filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmrw.interscience.wiley.com/eow/.
Webster's Ninth New Collegiate Dictionary, Merriam-Webster Inc., Publishers, Springfield, Massachusetts, USA, Copyright 1986, p. 1298.
White et al., "Optimisation of intermittently operated microfiltration processes," The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989), pp. 43-54.

Yoon: "Important operational parameters of membrane bioreactor-sludge disintegration (MBR-SD) system for zero excess sludge production," Water Research, 37 (2003), pp. 1921-1931, Elsevier, Amsterdam, NL.

Zenon, "Proposal for ZeeWeed® Membrane Filtration Equipment System for the City of Westminster, Colorado, Proposal No. 479-99," Mar. 2000, entire publication.

* cited by examiner

BACKWASH

TECHNICAL FIELD

The present invention relates to membrane filtration systems and more particularly, the backwashing of such systems.

BACKGROUND OF THE INVENTION

Porous membrane filtration systems require regular backwashing of the membranes to maintain filtration efficiency and flux while reducing transmembrane pressure (TMP) which rises as the membrane pores become clogged with impurities. Such systems usually have a number of membranes in the form of bundles or arrays of membranes located in a feed tank. Feed is thus applied to the surfaces of the membranes and filtrate withdrawn from the membrane lumens. Typically, during the backwash cycle the impurities are forced out of the membrane pores by pressurised gas, liquid or both into the feed tank or cell. The liquid containing impurities and deposits from the membranes is then drained or flushed from the tank.

The waste liquid displaced from the tank needs to be disposed of or reprocessed, usually in an environmentally safe manner, so any reduction in the volume of such waste liquid is seen as advantageous in terms of environmental impact and cost.

The draining or flushing of the tank, particularly when large arrays of membranes are used also requires time which results in down time of the filtration cycle. In order to reduce this down time large pumping systems are required to quickly drain and refill the tank. Where tanks or cells are arranged in banks and feed is used to refill the tank, a lowering in levels in other cells may be produced during the refill process. This again impinges on operating efficiency of the filtration system.

Reduction in backwash volume also reduces the volume of chemical cleaning agents required in some systems. This has the two-fold advantage of reducing cost in terms of chemical requirements while also reducing waste disposal problems.

Many filtration systems also employ a gas bubble aeration method to assist in scouring unwanted deposits from the surfaces of the porous membranes during the cleaning stage. In order for such aeration to be effective the membranes must be fully immersed in liquid.

Typically the cleaning p in such systems includes ceasing flow of feed liquid to the vessel in which the membranes are located, continuing the filtration process until the level of liquid in the tank reaches the top of the membranes, aerating the membranes with gas bubbles to scour impurities from the outer membrane surfaces for a period of time, then liquid backwashing the membrane pores. The tank is then drained or flushed to remove the waste liquid containing the impurities dislodged during the aeration and backwashing processes.

It will be appreciated that it is necessary to keep the membranes submerged so as to make the aeration step effective. Adding the liquid backwash at the end of the aeration step results in the liquid level in the tank rising above the membranes. This is "wasted volume" in terms of the requirement of keeping the membranes submerged.

SUMMARY OF THE INVENTION

The present invention seeks to overcome or at least ameliorate this and other disadvantages of the prior art.

According to one aspect, the present invention provides a method of backwashing a membrane filtration module, said module including one or more membranes located in a feed-containing vessel, the membranes having a permeable wall which is subjected to a filtration operation wherein feed containing contaminant matter is applied to one side of the membrane wall and filtrate is withdrawn from the other side of the membrane wall, the method including:

a) removing liquid from the feed-containing vessel until the level of liquid in the feed-containing vessel falls to a first level below an upper level of the membranes;

b) suspending the filtration operation;

c) performing a liquid backwash of the membrane wall until liquid level within the feed-containing vessel rises to a second predetermined level above said first level;

d) aerating the membrane surface with gas bubbles to dislodge fouling materials therefrom;

e) performing a sweep or drain down of the feed-containing vessel to remove the liquid containing the dislodged contaminant matter; and f) recommencing the filtration operation.

Preferably, the second predetermined level is selected such that the liquid level rises at least to the upper level of the membranes during the aeration step. Preferably, the flow of feed into the feed-containing vessel is suspended prior to removal step a). For preference, the removal of liquid is achieved fully or partially by the filtration process. Preferably, in a pressurized filtration system, a pressurized gas is employed during the filtration process to push the liquid from the feed side through the permeable membrane wall during the removal step a). The aeration step may commence prior to removal of liquid step and continue until the sweep or drain down step e).

This process has the advantage of reducing the backwash volume. Also, rather than filtering down to the required liquid level, it is possible to drain or pump away liquid in the feed-containing tank to achieve the same result. This has the advantage of not increasing the flux of the membrane during the filter down step, and can be done quickly to reduce filtration down time. The drained feed may be returned to the inlet of the filtration plant so as not to be wasted, or transferred to other tanks operating in parallel.

In an alternate method, the filtration step may be done at varying filtrate flows; the flow being adjusted to maintain a constant transmembrane pressure (TMP) as the liquid level drops down the membranes.

The TMP may be monitored during the removal of liquid step and used to determine when the liquid level has dropped below the top of the membranes, or how far below the upper level of the membranes the liquid level has dropped. This is possible because as more of the membrane is exposed the filtration area is less and the TMP will increase. TMP will also increase due to the fact that more of the filtrate flow travels further along the lumen so increasing the lumen pressure drop (assuming the flow is kept constant and filtrate is being withdrawn from the upper end of the membrane lumen). Accordingly, the change in TMP may be used to monitor the liquid level in the feed tank before commencing the liquid backwash step. This may also be used to adjust the filtrate flow and maintain a constant TMP so avoiding significant changes in the flux on the remaining filtrate area. Alternatively, such a method can be used to control to the TMP to any desired predetermined level, for example, it may desirable to lower the liquid level in the feed-containing tank, keeping the TMP at the maximum allowable TMP, say 85 kPa.

BRIEF DESCRIPTION OF THE DRAWINGS

A preferred embodiment of the invention will now be described, by way of example only, with reference to the accompanying drawings in which.

DESCRIPTION OF THE PREFERRED EMBODIMENT

Figure 1A:
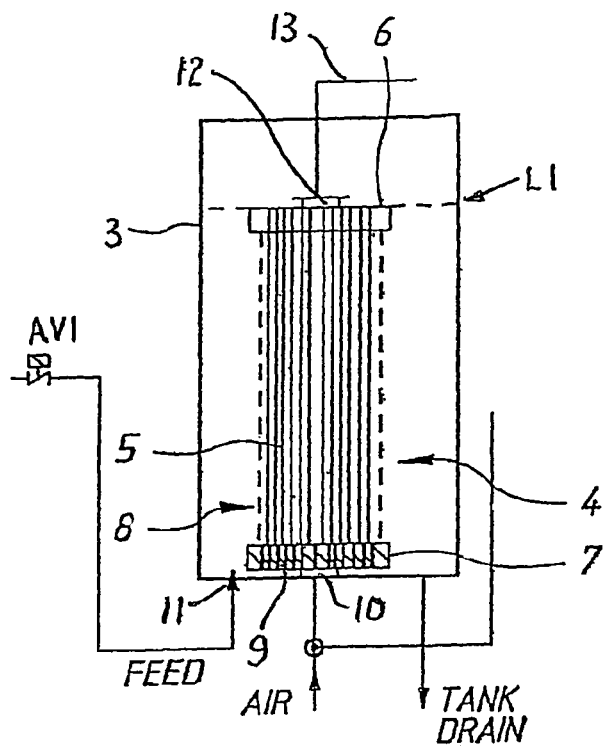
FIGS. 1a to 1e show schematic views of the membrane module at various stages of the backwash process according to an embodiment of the invention.

Referring to the FIGS. 1a to 1e, an illustrative embodiment of the invention is described. The filtration module 4 is mounted within a housing vessel 3 which contains the feed to be filtered. The filtration module 8 contains a bundle or bundles of hollow fibre membranes 5 extending between upper and lower headers 6 and 7, respectively. The lower header 7 is provided with a number of openings 9 communicating with the interior of the fibre bundle and an inlet port 10. Feed is supplied through port 11 under the control of valve AV1.

Permeate/filtrate is withdrawn through chamber 12 and line 13. A liquid backwash may also be applied through line 13.

Figure 1B:
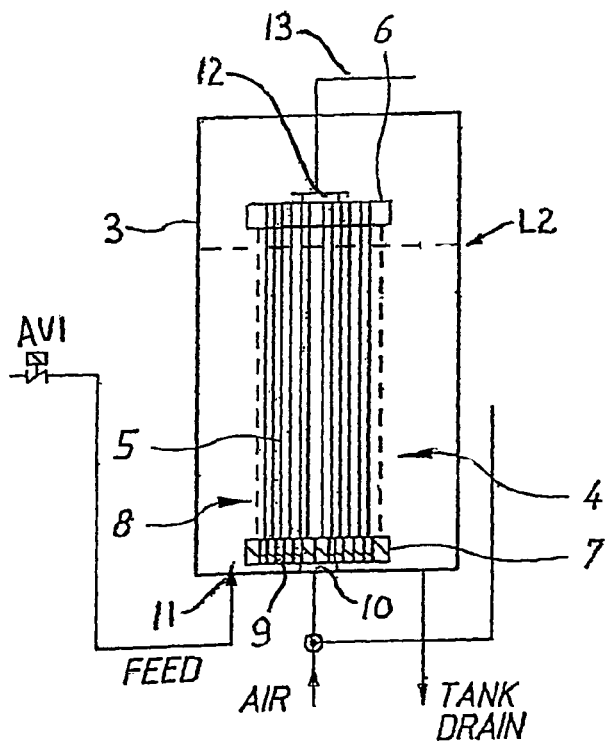

FIG. 1a shows the module in normal filtration operation with the liquid level in the vessel 3 at L1 covering the upper header 6. When the backwash stage is to be commenced, in this embodiment, the flow of feed is stopped by shutting valve AV1. Filtrate continues to be withdrawn through the fibre lumens and chamber 12 and line 13. The level of liquid in the vessel 3 falls, as shown in FIG. 1b, to level L2.

Figure 1C:
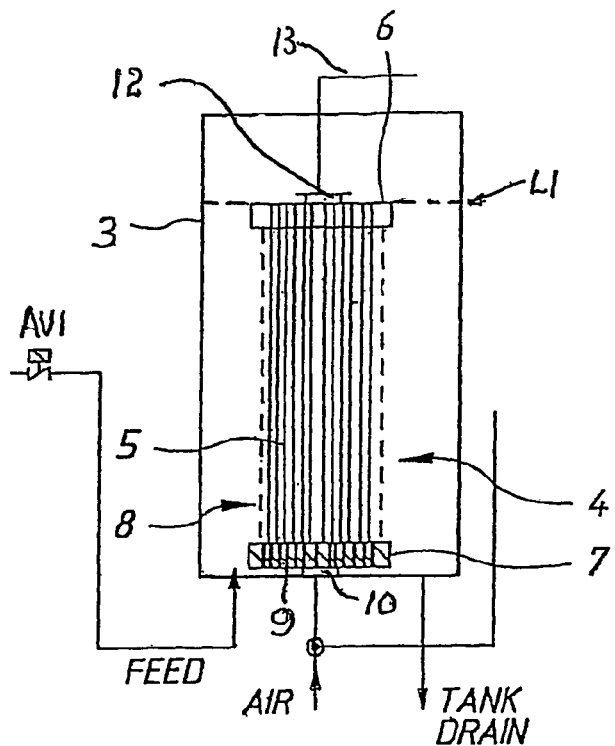
Figure 1D:
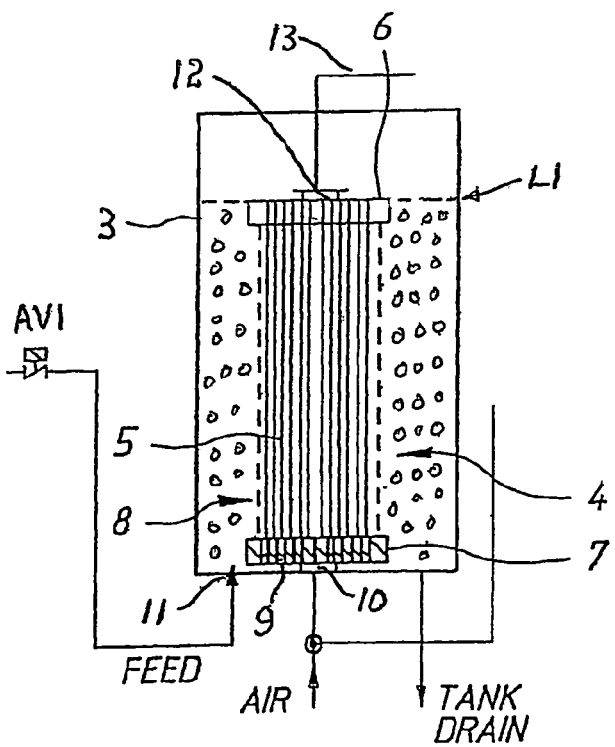

Once level L2 is reached, a liquid backwash is commenced by flowing liquid back through the fibre lumens and walls via line 13. This results in the liquid level again rising in the vessel to L1 as shown in FIG. 1c. An aeration step is then commenced by feeding gas through port 10 and openings 9 as shown in FIG. 1d. In another embodiment, the liquid level resulting from the liquid backwash may be just below level L1 such that level L1 is reached during the aeration step with the liquid level rising further as a result of bubbles present in the liquid. A similar result may be achieved by commencing the aeration step during the liquid backwash.

Figure 1E:
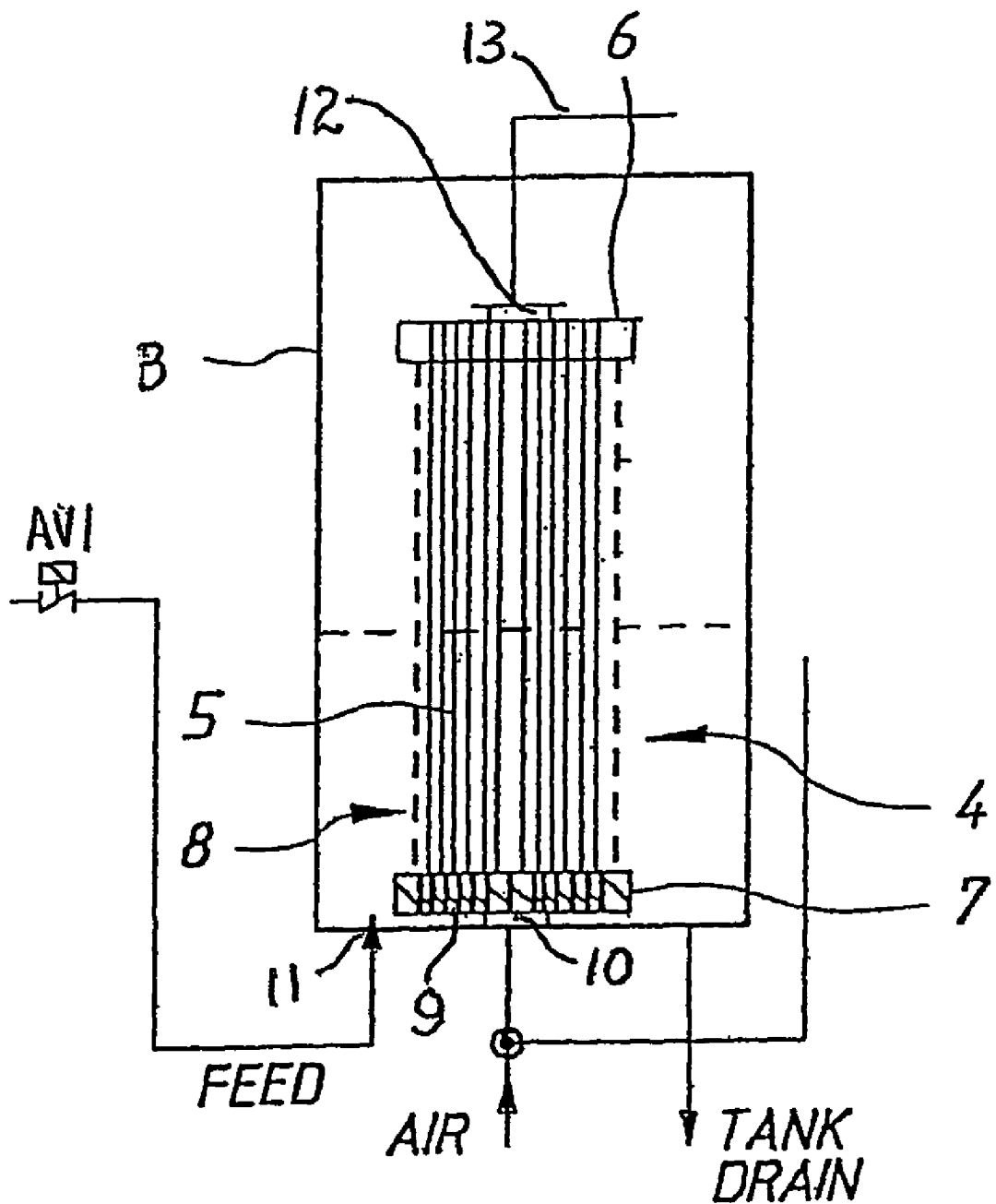

Once the aeration step is completed the vessel is swept or drained as shown in FIG. 1e to remove dislodged waste materials accumulated in the vessel liquid. Following this step feed is reintroduced to the vessel by opening valve AV1 and filtration recommenced.

Although the embodiment relates to vertically orientated membranes, it will be appreciated that the invention is not limited to such an orientation and the membranes may be orientated in any desired position or configuration.

It will be appreciated that the invention may be applied to both pressurized and non-pressurized systems where the feed-containing vessel is open to atmosphere.

It will be appreciated that further embodiments and exemplifications of the invention are possible with departing from the spirit or scope of the invention described.

The invention claimed is:

1. A method of backwashing one or more membranes in a vessel, the method comprising:
    removing liquid to be treated from the vessel until a level of the liquid falls to a first level within the vessel below an upper level of the one or more membranes, wherein the removal of liquid to be treated is at least partially accomplished by a filtration operation;
    suspending the removal of the liquid to be treated from the vessel when the level of the liquid to be treated falls to the first level;
    performing a liquid backwash of the one or more membranes when the first level is reached by the removal of the liquid to be treated from the vessel until the level of the liquid collected in the vessel comprising backwashed liquid is at a predetermined level above said first level;
    aerating a membrane surface of the one or more membranes; and
    removing liquid containing fouling materials dislodged from the membrane surface from the vessel;
    wherein the predetermined level provides sufficient liquid in the vessel to immerse an upper header of the one or more membranes during the aerating of the membrane surface.

2. The method according to claim 1, wherein the step of aerating the membrane surface comprises aerating the one or more membranes until a level of liquid comprising backwashed liquid within the vessel rises to at least the upper level of the one or more membranes.

3. The method according to claim 1, further comprising a step of suspending a flow of the liquid to be treated into the vessel prior to performing the step of removing liquid to be treated.

4. The method according to claim 1, wherein the step of aerating the membrane surface is commenced before performing the step of removing liquid to be treated, and is performed until the step of removing liquid containing fouling materials is performed.

5. The method according to claim 1, further comprising a step of applying a pressurized gas to the liquid to be treated during the filtration operation.

6. The method according to claim 1, wherein the step of removing liquid to be treated comprises draining the liquid from the vessel.

7. The method according to claim 1, wherein the step of removing liquid to be treated comprises pumping the liquid from the vessel.

8. The method according to claim 1, further comprising a step of returning liquid to be treated that was removed from the vessel back into the vessel.

9. The method according to claim 1, further comprising a step of introducing into the vessel liquid to be treated which has been removed from a second vessel.

10. The method according to claim 1, wherein the step of removing liquid to be treated comprises maintaining a substantially constant transmembrane pressure across the one or more membranes.

11. The method according to claim 10, wherein the transmembrane pressure is maintained at or below a predetermined value.

12. The method according to claim 1, further comprising a step of monitoring the transmembrane pressure across said one or more membranes.

13. The method according to claim 12, wherein the step of monitoring the transmembrane pressure is performed while performing the step of removing liquid to be treated.

14. The method according to claim 12, further comprising a step of determining the level of liquid in the vessel.

15. The method of claim 1, wherein the predetermined level is the same as a level of liquid in the vessel prior to removing liquid to be treated.

16. The method of claim 1, wherein aeration of the membrane surface is commenced while performing the liquid backwash.

17. The method of claim 1, wherein the membranes are non-vertically oriented.

18. The method of claim 1, wherein the predetermined level is below the upper level of the one or more membranes.

19. A method of backwashing a membrane filtration module in a vessel, said module including one or more membranes, the method comprising:
removing liquid from the vessel until a level of the liquid falls to a first level within the vessel below an upper level of the one or more membranes, wherein the removal of liquid from the vessel is at least partially accomplished by a filtration operation;
suspending the removal of the liquid from the vessel when the level of the liquid falls to the first level;
performing a liquid backwash of the one or more membranes, after removing the liquid from the vessel, until the level of liquid in the vessel rises to a predetermined level above the first level;
initiating aeration of the membrane surfaces of the one or more membranes after the liquid backwash is completed; and
removing liquid containing fouling materials dislodged from the membrane surfaces from the vessel, after aerating of the membrane surfaces is completed;
wherein the acts of removing liquid from the vessel, performing a liquid backwash, aerating membrane surfaces, and removing liquid containing fouling materials are performed within a single cycle, and wherein the predetermined level provides sufficient liquid in the vessel to immerse an upper header of the membrane filtration module during the aeration of the membrane surfaces.

20. The method of claim 19, wherein the first level is located above a lower header of the membrane module and below an upper header of the membrane module.

21. The method of claim 19, wherein the predetermined level is below the upper level of the one or more membranes.

22. The method of claim 19, wherein the step of performing a liquid backwash introduces less fluid into the vessel than the step of removing liquid from the vessel removes.

23. A method of treating water, comprising:
introducing water to be treated into a vessel;
filtering the water to be treated through membranes immersed in the water;
reducing a level of the water to be treated to a first level within the vessel below an upper level of the membranes, wherein the reduction of the level of the water to be treated is at least partially accomplished by a filtration operation;
commencing a backwash of the membranes when the first level is reached by the reduction of the level of water to be treated, the backwash continuing until a level of a water solution comprising backwashed liquid in the vessel rises to a second predetermined level above the first level; and
aerating the membranes;
wherein the second predetermined level provides sufficient liquid in the vessel to immerse an upper header of the membranes during the aeration of the membranes.

24. The method according to claim 23, further comprising a step of removing the water solution in the vessel after aerating the membranes.

* * * * *